(12) United States Patent
Nedovic (10) Patent No.: US 8,774,325 B2
(45) Date of Patent: Jul. 8, 2014

(54) CLOCK AND DATA RECOVERY CIRCUITS

(75) Inventor: Nikola Nedovic, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/563,548

(22) Filed: Jul. 31, 2012

(65) Prior Publication Data

US 2014/0037036 A1 Feb. 6, 2014

(51) Int. Cl.
*H04L 27/06* (2006.01)
*H04L 5/12* (2006.01)
*H04J 3/16* (2006.01)

(52) U.S. Cl.
USPC ................ 375/340; 375/261; 370/466

(58) Field of Classification Search
USPC .......................................... 375/233; 333/165
See application file for complete search history.

(56) References Cited

U.S. PATENT DOCUMENTS

| | | | | |
|---|---|---|---|---|
| 3,763,328 | A * | 10/1973 | Lester et al. | 360/8 |
| 4,140,975 | A * | 2/1979 | Cochran et al. | 333/165 |
| 4,499,422 | A * | 2/1985 | Sinclair | 324/339 |
| 4,502,024 | A * | 2/1985 | Nishikawa et al. | 332/109 |
| 4,585,938 | A * | 4/1986 | Neumann et al. | 250/235 |
| 2002/0036538 | A1* | 3/2002 | Choi | 327/560 |
| 2002/0084841 | A1* | 7/2002 | Taguchi et al. | 329/312 |
| 2003/0058930 | A1* | 3/2003 | Sawada et al. | 375/233 |
| 2010/0002822 | A1* | 1/2010 | Arima et al. | 375/371 |
| 2010/0188148 | A1* | 7/2010 | Mehta et al. | 330/149 |
| 2012/0062291 | A1* | 3/2012 | Saitoh | 327/157 |

OTHER PUBLICATIONS

S. Sidiropoulos and M. Horowitz, "A semidigital dual delay-locked loop," IEEE J. Solid-State Circuits, vol. 32, No. 11, pp. 1683-1692, Nov. 1997.
P. Larsson, "A Feb. 1600-MHz CMOS clock recovery PLL with low-VDD capability," IEEE J. Solid-State Circuits, vol. 34, No. 12, pp. 1951-1960, Dec. 1999.
P. K. Hanumolu et al., "A Wide-Tracking Range Clock and Data Recovery Circuit", IEEE J. Solid-State Circuits, vol. 43, No. 2, pp. 425-439, Feb. 2008.
T. Toifl et al., "A 0.94-ps-RMS-Jitter 0.016-mm2 2.5-GHz Multiphase Generator PLL with 360° Digitally Programmable Phase Shift for 10-Gb/s Serial Links", IEEE JSSC, vol. 40, No. 12, p. 2700-2712, Dec. 2005.

* cited by examiner

*Primary Examiner* — Leon-Viet Nguyen
*Assistant Examiner* — Sarah Hassan
(74) *Attorney, Agent, or Firm* — Maschoff Brennan (57) ABSTRACT

A circuit may include a phase difference selector, a clock signal generator, a reference clock phase detector, and a data signal phase detector. The phase difference selector may be configured to select one of multiple reference clock phase difference signals generated by the reference clock phase detector based on a difference in phase between multiple clock signals and a reference clock. The clock signal generator may be configured to generate the multiple clock signals based on the selected reference clock phase difference signal. The data signal phase detector may be configured to generate a data phase difference signal based on differences in phase between the clock signals and a data signal. The data phase difference signal may be used by the phase difference selector to select one of the reference clock phase difference signals.

20 Claims, 6 Drawing Sheets

CLOCK AND DATA RECOVERY CIRCUITS

FIELD

The embodiments discussed herein are related to clock and data recovery circuits.

BACKGROUND

Clock and data recovery circuits may be used in various settings. For example, a clock and data recovery circuit may be used for communicating between integrated circuits, in an optical network, and in other circumstances. Typically, a clock and data recovery circuit may be used to recover a clock from a data stream sent between the integrated circuits or over the optical network. The clock and data recovery circuit may also be used to re-time the data in the data stream to the recovered clock.

Due to increased data speeds in modern technologies, designs of clock and data recovery circuits have become increasingly complex, require additional circuitry, and have complex timing requirements. Additionally, due to increased data speed requirements and increased complexity, clock and data recovery circuits may account for a large portion of a power consumption of an integrated circuit that contains the clock and data recovery circuits. Additionally, each clock and data recovery circuit may occupy a relatively large portion of a footprint of an integrated circuit that contains the clock and data recovery circuit.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a circuit may include a phase difference selector, a clock signal generator, a reference clock phase detector, and a data signal phase detector. The phase difference selector may be configured to select one of multiple reference clock phase difference signals. The clock signal generator may be coupled to the phase difference selector. The clock signal generator may be configured to generate multiple clock signals based on the selected reference clock phase difference signal. Each of the clock signals may have the same frequency and a different phase. The reference clock phase detector may be coupled to the phase difference selector and the clock signal generator. The reference clock phase detector may be configured to generate the reference clock phase difference signals. Each of the reference clock phase difference signals may represent a phase difference between a reference clock and one of the clock signals. The data signal phase detector may be coupled to the clock signal generator and the phase difference selector. The data signal phase detector may be configured to generate a data phase difference signal based on differences in phase between one or more of the clock signals and a data signal. The data phase difference signal may be used by the phase difference selector to select one of the reference clock phase difference signals.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein may include a clock and data recovery circuit that may be configured to use a clock rate that is a fraction of a data rate of a received data signal to sample multiple data bits from the data signal in one clock period. To sample multiple data bits in one clock sample, the clock and data recovery circuit may be configured to generate multiple clock signals with the same frequency and different phases. The clock and data recovery circuit may also be configured to adjust the phases of the generated clock signals based on an interpolation of phase differences between the clock signals and a received data signal to align the phases of the generated clock signals with the phase of the data signal. Once the phases of the generated clock signals and the phase of the data signal are aligned, the data bits from the data signal may be sampled.

To align the phases of the clock signals with the phase of the data signal, the clock and data recovery circuit may generate a data phase difference signal indicating a phase difference between the data signal and the generated clock signals. The data phase difference signal may be encoded by a sigma delta modulator to generate an encoded data phase difference signal that is a low-resolution signal of the data phase difference signal and that changes more frequently than the data phase difference signal.

The clock and data recovery circuit may also generate multiple reference clock phase difference signals. Each of the reference clock phase difference signals may indicate a phase difference between one of the generated clock signals and a reference clock of the clock and data recovery circuit. Using the encoded data phase difference signal, the clock and data recovery circuit may select one of the reference clock phase difference signals to generate the clocks signals. The selected reference clock phase difference signal may approximate the phase difference between the data signal and the clocks signals. Using the selected reference clock phase difference signal, the clock and data recovery circuit may adjust the phase of the clock signals to align the phases of the clocks signals with the phase of the data signal. In some embodiments, the frequency of change of the encoded data phase difference signal may be larger than the bandwidth of the clock and data recovery circuit causing the clock and data recovery circuit to adjust the phases of the clock signals based on an average of two or more selected reference clock phase difference signals.

The above described configuration of the clock and data recovery circuit provides various advantages. For example, the clock and data recovery circuit does not utilize a phase interpolator or phase rotator. By not using a phase interpolator or phase rotator, the phase adjustment is more linear, which may ease the design for low supply voltages. Furthermore, not using a phase interpolator or phase rotator may decrease delay in the clock and data recovery circuit and requires less control circuitry to handle the complexities associated with selecting windows for rotating phases based on the phase of the reference clock and the clock signals. Additionally, the clock and data recovery circuit may have a smaller footprint and uses less power than other clock and data recovery circuits that utilize digital to analog converters and other complex circuitry to achieve similar results.

Embodiments of the present invention will be explained with reference to the accompanying drawings.

Figure 1:
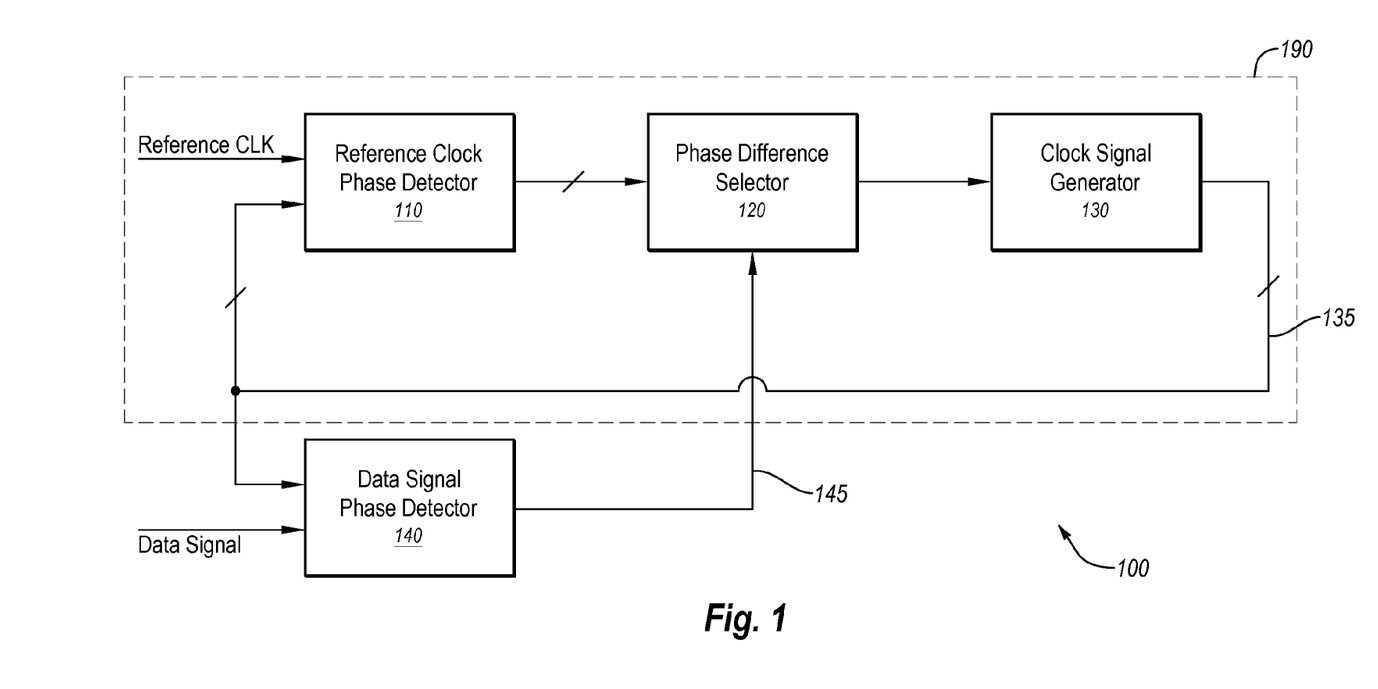
FIG. 1 is a block diagram of an example clock and data recovery circuit.

FIG. 1 is a block diagram of an example clock and data recovery circuit 100 (hereinafter "circuit 100"), arranged in accordance with at least some embodiments described herein. The circuit 100 may include a reference clock phase detector 110, a phase difference selector 120, a clock signal generator 130, a clock feedback loop 135, a data signal phase detector 140, and a data signal feedback loop 145.

The reference clock phase detector 110, the phase difference selector 120, the clock signal generator 130, and the clock feedback loop 135 may be part of a clock generating loop 190 that may be configured to generate multiple clock signals from a reference clock ("Reference CLK" in the Figures) received at the reference clock phase detector 110. In some embodiments, the clock generating loop 190 may be configured in a phase-lock-loop configuration.

The circuit 100 may use the generated clock signals to sample multiple data bits from a data signal in one clock period of one of the clock signals. To sample multiple data bits from the data signal during one clock period, the circuit 100 may align phases of the clock signals with a phase of the data signal. To align the phases of the clock signals with the phase of the data signal, the circuit 100, and in particular, the data signal phase detector 140, may determine a difference between the phases of the clock signals and the phase of the data signal. The difference between the phases of the clock signals and the phase of the data signal may be sent along the data signal feedback loop 145 to the phase difference selector 120. Introducing the difference between the phases of the clock signals and the phase of the data signal into the clock generating loop 190 may allow the clock generating loop 190 to adjust the phases of the clock signals so that the phases of the clock signals align with the phase of the data signal. The function of the individual components within the circuit 100 is now explained.

The reference clock phase detector 110 may be configured to receive the reference clock and the clock signals from the clock signal generator 130 along the clock feedback loop 135. The reference clock may be generated by another circuit; an oscillator, such as a crystal; or some other device. The reference clock phase detector 110 may also be configured to generate multiple reference clock phase difference signals. The reference clock phase difference signals may indicate a phase difference between the reference clock and the clocks signals.

In particular, the reference clock phase detector 110 may generate a reference clock phase difference signal for each of the clock signals that the reference clock phase detector 110 receives from the clock signal generator 130. For example, if the reference clock phase detector 110 receives first and second clock signals, the reference clock phase detector 110 may generate first and second reference clock phase differences signals. The first reference clock phase difference signal may indicate a phase difference between the reference clock and the first clock. The second reference clock phase difference signal may indicate a phase difference between the reference clock and the second clock. The reference clock phase detector 110 may include a frequency mixer, an analog multiplier, a logic circuit, or some other device that may generate reference clock phase difference signals. In some embodiments, the reference clock phase detector 110 may be either digital or analog.

The reference clock phase detector 110 may also be configured to send the generated reference clock phase difference signals to the phase difference selector 120.

The phase difference selector 120 may be configured to receive the reference clock phase difference signals from the reference clock phase detector 110 and to receive a data phase difference signal from the data signal phase detector 140 along the data signal feedback loop 145. Based on the received data phase difference signal, the phase difference selector 120 may select one of the reference clock phase difference signals to send to the clock signal generator 130. In particular, the phase difference selector 120 may select the reference clock phase difference signal that best approximates a phase difference between the clock signals and a data signal as indicated by the data phase difference signal.

The clock signal generator 130 may be configured to receive the selected reference clock phase difference signal from the phase difference selector 120. The clock signal generator 130 may also be configured to generate the multiple clock signals based on the selected reference clock phase difference signal. In particular, the selected reference clock phase difference signal may indicate a phase difference between the clock signals and a data signal received by the data signal phase detector 140. Based on the phase difference, the clock signal generator 130 may adjust the phase of one or more of the clock signals. For example, if the phases of the clock signals are leading the phase of the data signal, the phases of the clock signals may be slowed down to approximately synchronize with the phase of the data signal. By adjusting the phase of one or more of the clock signals, the clock signal generator 130 may generate clock signals with phases that approximately align with the phase of the data signal.

The clock signal generator 130 may include one or more devices. For example, in some embodiments, the clock signal generator 130 may include a charge pump, a filter loop, and a voltage controlled oscillator. The charge pump may be configured to receive the reference clock phase difference signal. In these and other embodiments, each of the reference clock phase difference signals may include two signals. One of the two signals may indicate to the charge pump to increase a voltage at the charge pump's output. Another of the two signals may indicate to the charge pump to decrease the voltage at the charge pump's output. The loop filter may filter high frequency components at the charge pump's output. The filtered voltage at the charge pump's output may control the voltage controlled oscillator. For example, an increase in voltage may skew the phases of the clock signals in one direction and a decrease in voltage may skew the phases of the clock signals in another direction.

The clock signal generator 130 may be further configured to send the generated clock signals to the reference clock phase detector 110 and the data signal phase detector 140 along the clock feedback loop 135.

The data signal phase detector 140 may be configured to receive a data signal from an outside circuit and the clocks signals from the clock signal generator 130 along the clock feedback loop 135. The data signal phase detector 140 may be further configured to generate the data phase difference signal that indicates the phase difference between the data signal and the clock signals. The data signal phase detector 140 may determine the phase difference between the data signal and the clock signal based on the alignment of the edges of the clock signals and transitions between signaling levels in the data signal.

In some embodiments, the data signal phase detector 140 may include one or more devices. For example, the data signal phase detector 140 may include a phase detector and a low pass filter. In some embodiments, the data signal phase detector 140 may be implemented in the analog or digital domain. Alternately or additionally, the data signal phase detector 140 may be implemented in both the analog and digital domain. For example, the phase detector may be analog and the low pass filter may be digital.

The data signal phase detector 140 may be further configured to send the data phase difference signal to the phase difference selector 120 along the data signal feedback loop 145. As indicated above, the phase difference selector 120 may use the data phase difference signal to select a reference clock phase detector signal for sending to the clock signal generator 130.

By aligning or approximately aligning the phases of the clock signals with the phase of the data signal, the clock signals may be used to sample multiple data bits from the data signal in a single period of one of the clock signals. Sampling multiple data bits from the data signal in a single period of one of the clock signals may allow for the clock signals to operate at a lower frequency than the data signal. This may relax requirements for sampling latches that may sample the data bits from the data signal as well as for other clock distribution circuitry. The number of sampled data bits within one clock period may determine the number of clock signals generated by the clock signal generator 130. For example, in some embodiments, the number of clock signals may be 2 or 3 times the number of sampling bits. In these and other embodiments, the number of generated clock signals may be 2, 3, 4, 5, 6, 7, 8, 9, 10, 11, 12, or some other number of generated clock signals. As an example, if the number of generated clock signals is 8, the clock signals may be used to sample 4 bits of data from the data signal during one period of one of the generated clock signals. The number of data bits sampled may also determine the number of reference clock phase difference signals and other aspects of the circuit 100.

Figure 2:
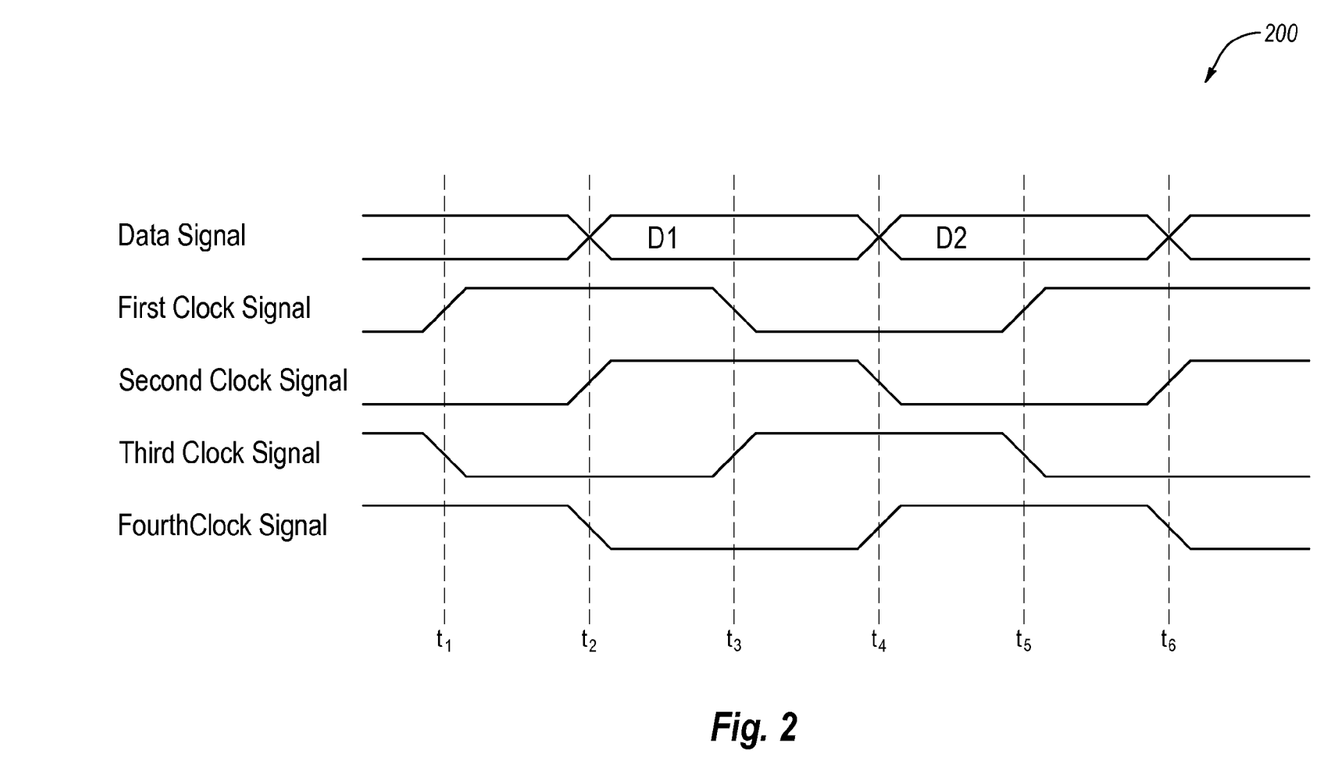
FIG. 2 illustrates a timing diagram of various signals associated with the clock and data recovery circuit of FIG. 1.

FIG. 2 illustrates a timing diagram 200 of various signals associated with the clock and data recovery circuit 100 of FIG. 1, arranged in accordance with at least some embodiments described herein. The timing diagram 200 includes the waveform of a data signal and first, second, third, and fourth clock signals at times t1, t2, t3, t4, t5, and t6. The data signal may be similar to and/or correspond to the data signal of FIG. 1. The first, second, third, and fourth clock signals may be similar to and/or correspond to clock signals generated by the clock signal generator 130 of FIG. 1. The timing diagram 200 illustrates how multiple data bits of the data signal may be sampled using clocks of varying phase with frequencies slower than the frequency of the data signal.

The first, second, third, and fourth clock signals may have clock periods, measured from rising edge to rising edge, that are approximately equal to an aggregate length of two data bits D1 and D2. In particular, the clock periods of the first, second, third, and fourth clock signals may last for four time units as illustrated in FIG. 2. Each of the data bits D1 and D2 may last for two time units. In some embodiments, more clock signals may be used than is necessary to capture the data to increase a resolution of a clock and data recovery circuit. For example, as illustrated in FIG. 2, two clock signals may be used to capture the data bits D1 and D2, however, in the illustrated embodiment, four clock signals are used to increase the resolution. In some embodiments, a number of clock signals of a clock and data recover circuit may be equal to a number of data bits sampled during a clock period of the clock and data recovery circuit.

As illustrated, the phases of the first, second, third, and fourth clock signals are offset by 90 degrees. Because the phases of the first, second, third, and fourth clock signals are offset, the first, second, third, and fourth clock signals may be used to sample the first and second data bits D1 and D2 in one clock period of the first, second, third, and fourth clock signals. For example, at t2, the second clock signal has a rising edge and the data signal transitions to the data bit D1. At t3, the third clock signal has a rising edge and the data signal is in the middle of a unit interval of the data bit D1. With the rising edge of the third clock in the middle of the unit interval of the data bit D1, the data bit D1 may be sampled at t3.

The phase difference between the data signal and the second and third clocks may be calculated based on the second clock signal rising edge occurring at the transition to the data bit D1 and the third clock signal rising edge occurring at the middle of the unit interval for the data bit D1. For example, if the difference between the timing of the rising edges of the second and third clock signals is more or less than half of the unit interval of the data bit D1, then the phase of the first, second, third, and fourth clock signals may not be aligned with the data signal. In a similar manner, the rising edges of the fourth and first clock signals correspond respectively with a transition and a middle of a unit interval of the data bit D2. In some embodiments, there may be a symmetry between the phases of the first, second, third, and fourth clock signals. As a result of the symmetry, a phase difference between data signals and a given clock signal(s) may be determined based on any combination of the given clock signal, clock signal(s) adjacent to the given clock signal(s), and any order of data bits.

Although the timing diagram 200 illustrates four clock signals to sample 2 data bits, in some embodiments, only two clock signals may be used. Alternately or additionally, in some embodiments, six clock signals may be used. The relationship between the first, second, third, and fourth clock signals and the data signal is illustrated as an example only. The present disclosure is not limited to half rate sampling as illustrated, but may include quarter rate sampling, eighth rate sampling, and other sampling rates.

Figure 3:
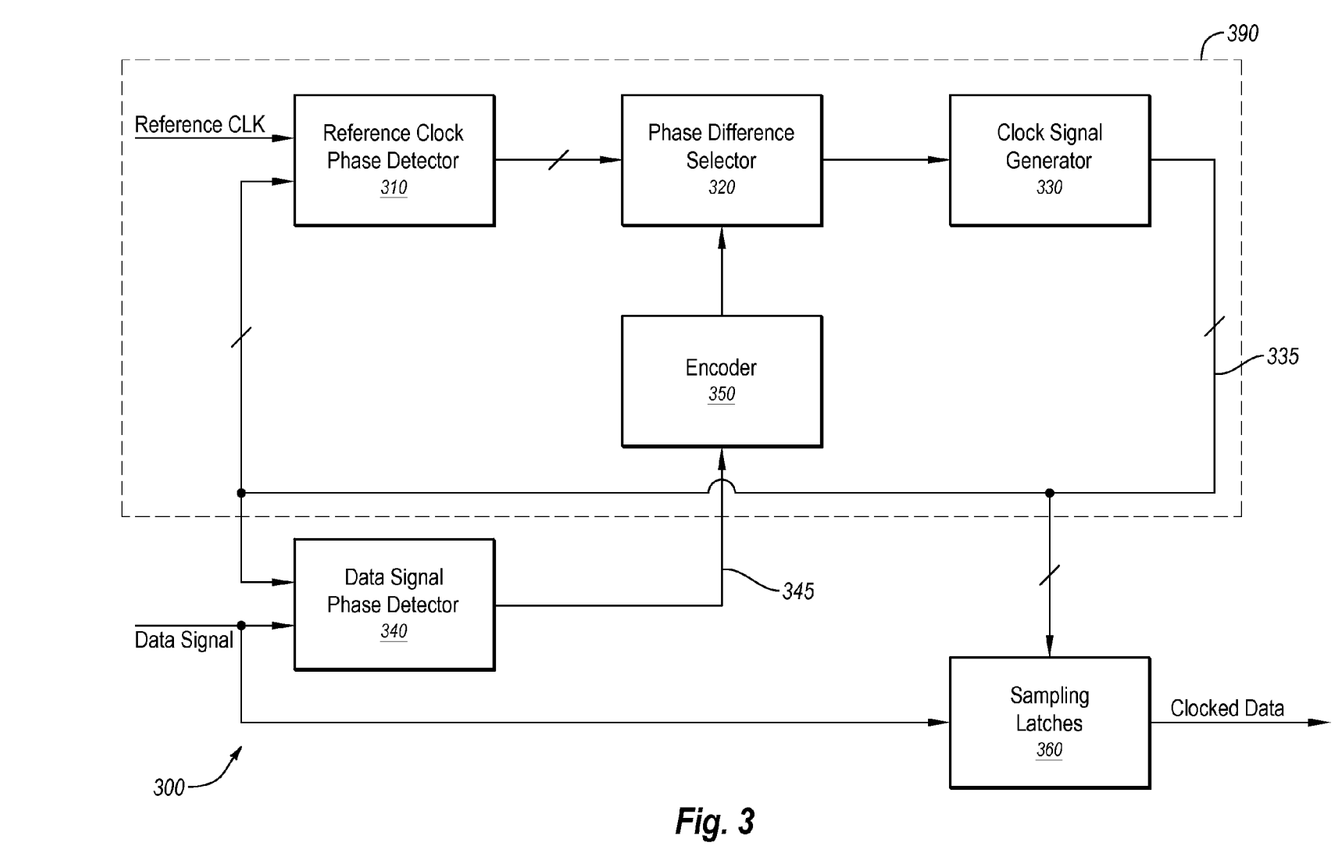
FIG. 3 is a block diagram of another example clock and data recovery circuit.

FIG. 3 is a block diagram of another example clock and data recovery circuit 300 (hereinafter "circuit 300"), arranged in accordance with at least some embodiments described herein. The circuit 300 may include a reference clock phase detector 310, a phase difference selector 320, a clock signal generator 330, a clock feedback loop 335, a data signal phase detector 340, a data signal feedback loop 345, an encoder 350, and sampling latches 360.

The reference clock phase detector 310, the phase difference selector 320, the clock signal generator 330, the clock feedback loop 335, and the encoder 350 may be part of a clock generating loop 390 that may be configured to generate multiple clock signals from a reference clock received at the reference clock phase detector 310. Some aspects of the clock generating loop 390 may be similar to and/or correspond to the clock generating loop 190 of FIG. 1.

The circuit 300 may use the generated clock signals to sample multiple data bits from a data signal in one clock period of one of the clock signals. To sample multiple data bits from the data signal during one clock period, the circuit 300 may align phases of the clock signals with a phase of the data signal. To align the phases of the clock signals with the phase of the data signal, the circuit 300, and in particular, the data signal phase detector 340, may determine a difference between the phases of the clock signals and the phase of the data signal. The difference between the phases of the clock signals and the phase of the data signal may be sent as a data phase difference signal along the data signal feedback loop 345 to the encoder 350. The encoder 350 may encode the data phase difference signal to form an encoded data phase difference signal that has a lower resolution than the data phase difference signal. The encoded data phase difference signal may be sent to the phase difference selector 320. Introducing the difference between the phases of the clock signals and the phase of the data signal into the clock generating loop 390 may allow the clock generating loop 390 to adjust the phases of the clock signals so that the phases of the clock signals align with the phase of the data signal. The function of the individual components within the circuit 300 is now explained.

The reference clock phase detector 310 may be configured to receive the reference clock and the clock signals from the clock signal generator 330 along the clock feedback loop 335 and to generate a reference clock phase difference signal for each of the clock signals that the reference clock phase detector 310 receives from the clock signal generator 330. The reference clock phase detector 310 may also be configured to send the generated reference clock phase difference signals to the phase difference selector 320. In some embodiments, the reference clock phase detector 310 may be similar to and/or correspond to the reference clock phase detector 110 of FIG. 1.

The phase difference selector 320 may be configured to receive the reference clock phase difference signals from the reference clock phase detector 310 and to receive the encoded data phase difference signal from the encoder 350. Based on the received encoded data phase difference signal, the phase difference selector 320 may select one of the reference clock phase difference signals to send to the clock signal generator 330. In some embodiments, the phase difference selector 320 may be similar to and/or correspond to the phase difference selector 120 of FIG. 1.

The clock signal generator 330 may be configured to receive the selected reference clock phase difference signal from the phase difference selector 320. The clock signal generator 330 may also be configured to generate the multiple clock signals based on the selected reference clock phase difference signal. The clock signal generator 330 may be further configured to send the generated clock signals to the reference clock phase detector 310 and the data signal phase detector 340 along the clock feedback loop 335. In some embodiments, the clock signal generator 330 may be similar to and/or correspond to the clock signal generator 130 of FIG. 1.

The data signal phase detector 340 may be configured to receive a data signal from an outside circuit and the clocks signals from the clock signal generator 330. The data signal phase detector 340 may be further configured to generate the data phase difference signal that indicates the phase difference between the data signal and the clock signals. The data signal phase detector 340 may send the data phase difference signal to the encoder 350 along the data signal feedback loop 345. In some embodiments, the data signal phase detector 340 may be similar to and/or correspond to the data signal phase detector 140 of FIG. 1.

The encoder 350 may be configured to receive the data phase difference signal from the data signal phase detector 340. The encoder 350 may be further configured to encode the data phase difference signal to generate the encoded data phase difference signal. The encoded data phase difference signal may have a lower resolution than the data phase difference signal. However, the encoded data phase difference signal may operate at a higher frequency than the data phase difference signal so that an average of the encoded data phase difference signal over a period of time is approximately equal to the data phase difference signal. For example, the data phase difference signal may be a digital 8 bit signal operating at 1 giga-hertz (GHz). The encoded data phase difference signal may be a digital 3 bit signal operating at 3 GHz where an average of the 3 bit signal over three clock periods is equal to the 8 bit signal over one clock period. The encoder 350 may be further configured to send the encoded data phase difference signal to the phase difference selector 320.

In some embodiments, the encoder 350 may encode the data phase difference signal so that the number of states of the encoded data phase difference signal equals the number of reference clock phase difference signals. For example, if the reference clock phase detector 310 generated eight reference clock phase difference signals, the encoded data phase difference signal may be 3 bits to have 8 different states, one state for each of the eight reference clock phase difference signals. In some embodiments, the encoder 350 may be digital or analog. In some embodiments, the encoder 350 may be a sigma delta modulator.

As noted above, the phase difference selector 320 may select between the reference clock phase difference signals based on the received encoded data phase difference signal. In some embodiments, the phase difference selector 320 may include a multiplexer that uses the encoded data phase difference signal to select one of the reference clock phase difference signals for sending to the clock signal generator 330.

A bandwidth of the encoded data phase difference signal may be greater than a bandwidth of the clock generating loop 390 and in particular, greater than a bandwidth of the clock signal generator 330. The bandwidth of the encoded data phase difference signal may indicate a maximum rate of change of the encoded data phase difference signal. The bandwidth of the clock generating loop 390 may indicate a maximum rate of change of the clock generating loop 390. For example, if a data signal is changing faster than the bandwidth of the clock generating loop 390; the clock generating loop 390 may not react to the changing data signal. In these and other embodiments, if a data signal being received by the clock generating loop 390 is changing faster than the bandwidth of the clock generating loop 390, the clock generating loop 390 may average two or more of the fast changing data signals and then respond to the average of the two or more fast changing data signals.

The encoded data phase difference signal may cause the selected clock phase difference signal to change faster than the bandwidth of the clock generating loop 390, and in particular, faster than the bandwidth of the clock signal generator 330. As a result, the clock signal generator 330 may adjust the phases of the clock signals based on an average of two or more of the selected clock phase difference signals. Basing its adjustments on an average of two or more of the selected clock phase difference signals may allow the clock signal generator 330 to adjust the phases of the clock signals based on data comparable to the higher resolution data phase difference signal generated by the data signal phase detector 340 instead of the lower resolution encoded data phase difference signal generated by the encoder 350. Thus, even though the phase difference selector 320 may use the lower resolution encoded data phase difference signal to select the clock phase difference signals, the clock signal generator 330 may adjust the phases of the clock signals based on the higher resolution data phase difference signal. By temporarily using a lower resolution data phase difference signal to select the reference clock phase difference signal, the power efficiencies and the footprint of the circuit 300 may be reduced while maintaining an approximate equal level of operation of the circuit 300.

In some embodiments, the clock signal generator 330 may include a charge pump and a loop filter. The charge pump and the loop filter may have be used by the clock signal generator 330 to average two or more of the selected reference clock phase difference signals to generate a signal approximately equal to the data phase difference signal on which to base adjustments to the phases of the clock signals.

The sampling latches 360 may be configured to receive the data signal and to sample the data signal using the clock signals. The sampling latches 360 may output clocked data based on the sampled data signal.

Figure 4A:
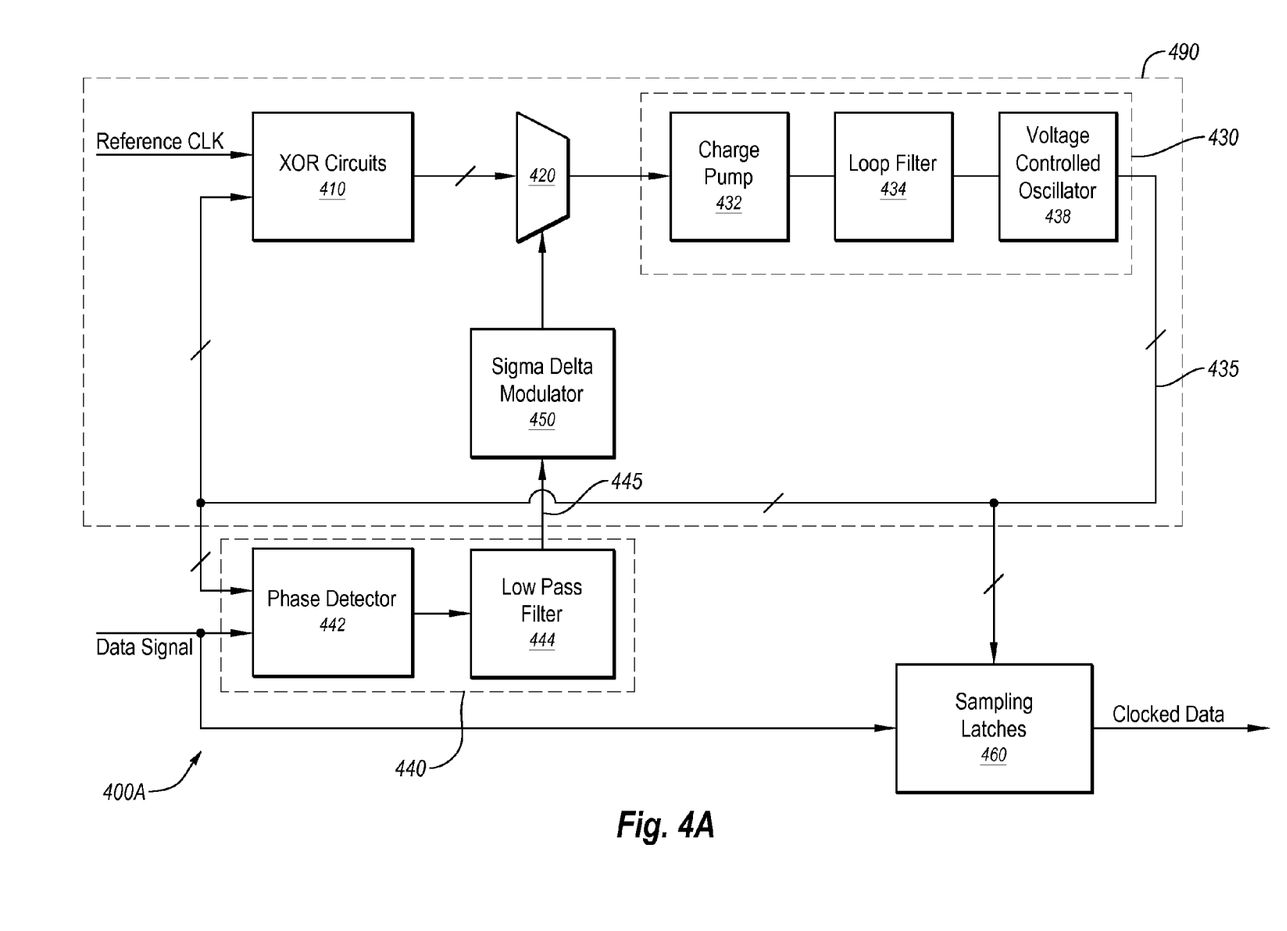
FIG. 4A is a block diagram of another example clock and data recovery circuit.

FIG. 4A is a block diagram of another example clock and data recovery circuit 400A (hereinafter "circuit 400A"), arranged in accordance with at least some embodiments described herein. The circuit 400A may include exclusive or (XOR) circuits 410, a multiplexer 420, a clock signal generator 430, a clock feedback loop 435, a data signal phase detector 440, a data signal feedback loop 445, a sigma delta modulator 450, and sampling latches 460.

The XOR circuits 410, the multiplexer 420, the clock signal generator 430, the clock feedback loop 435, and the sigma delta modulator 450 may be part of a clock generating loop 490 that may be configured to generate multiple clock signals from a reference clock received at the XOR circuits 410. The clock generating loop 490 may be similar to and/or correspond to the clock generating loop 390 of FIG. 3.

The XOR circuits 410 may correspond to an embodiment of the reference clock phase detectors 110 and 310 of FIGS. 1 and 3. The multiplexer 420 may correspond to an embodiment of the phase difference selectors 120 and 320 of FIGS. 1 and 3. The clock signal generator 430 may correspond to an embodiment of the clock signal generators 130 and 330 of FIGS. 1 and 3. The data signal phase detector 440 may correspond to an embodiment of the data signal phase detectors 140 and 340 of FIGS. 1 and 3.

The XOR circuits 410 may be configured to receive the reference clock and the clock signals from the clock signal generator 430. The XOR circuits 410 may also be configured to generate a reference clock phase difference signal for each of the clock signals that the XOR circuits 410 receive from the clock signal generator 430 by performing an exclusive or (XOR) function on the clock reference and each of the clock signals. The XOR circuits 410 may also be configured to send the generated reference clock phase difference signals to the multiplexer 420.

The multiplexer 420 may be configured to receive the reference clock phase difference signals from the XOR circuits 410 and to receive the encoded data phase difference signal from the sigma delta modulator 450. Based on the received encoded data phase difference signal, the multiplexer 420 may select one of the reference clock phase difference signals to send to the clock signal generator 430.

The clock signal generator 430 may be configured to receive the selected reference clock phase difference signal from the multiplexer 420 and to generate the clock signals based on the selected reference clock phase difference signal. The clock signal generator 430 may include a charge pump 432, a loop filter 434, and a voltage controlled oscillator 438.

The data signal phase detector 440 may be configured to receive a data signal from an outside circuit and the clocks signals from the clock signal generator 430 along the clock feedback loop 435. The data signal phase detector 440 may be further configured to generate the data phase difference signal that indicates the phase difference between the data signal and the clock signals. The data signal phase detector 440 may include a phase detector 442 and a low pass filter 444.

The sigma delta modulator 450 may be configured to receive the data phase difference signal from the data signal phase detector 440 and to encode the data phase difference signal to generate the encoded data phase difference signal. The encoded data phase difference signal may have a lower resolution than the data phase difference signal and have a larger bandwidth than the charge pump 432 and the loop filter 434. As a result, in some embodiments, the charge pump 432 and the loop filter 434 may send a signal to the voltage controlled oscillator 438 to adjust the phases of the clock signals based on an average of two or more of the selected clock phase difference signals.

The sampling latches 460 may be configured to receive the data signal and to sample the data signal using the clock signals. The sampling latches 460 may output clocked data based on the sampled data signal.

Figure 4B:
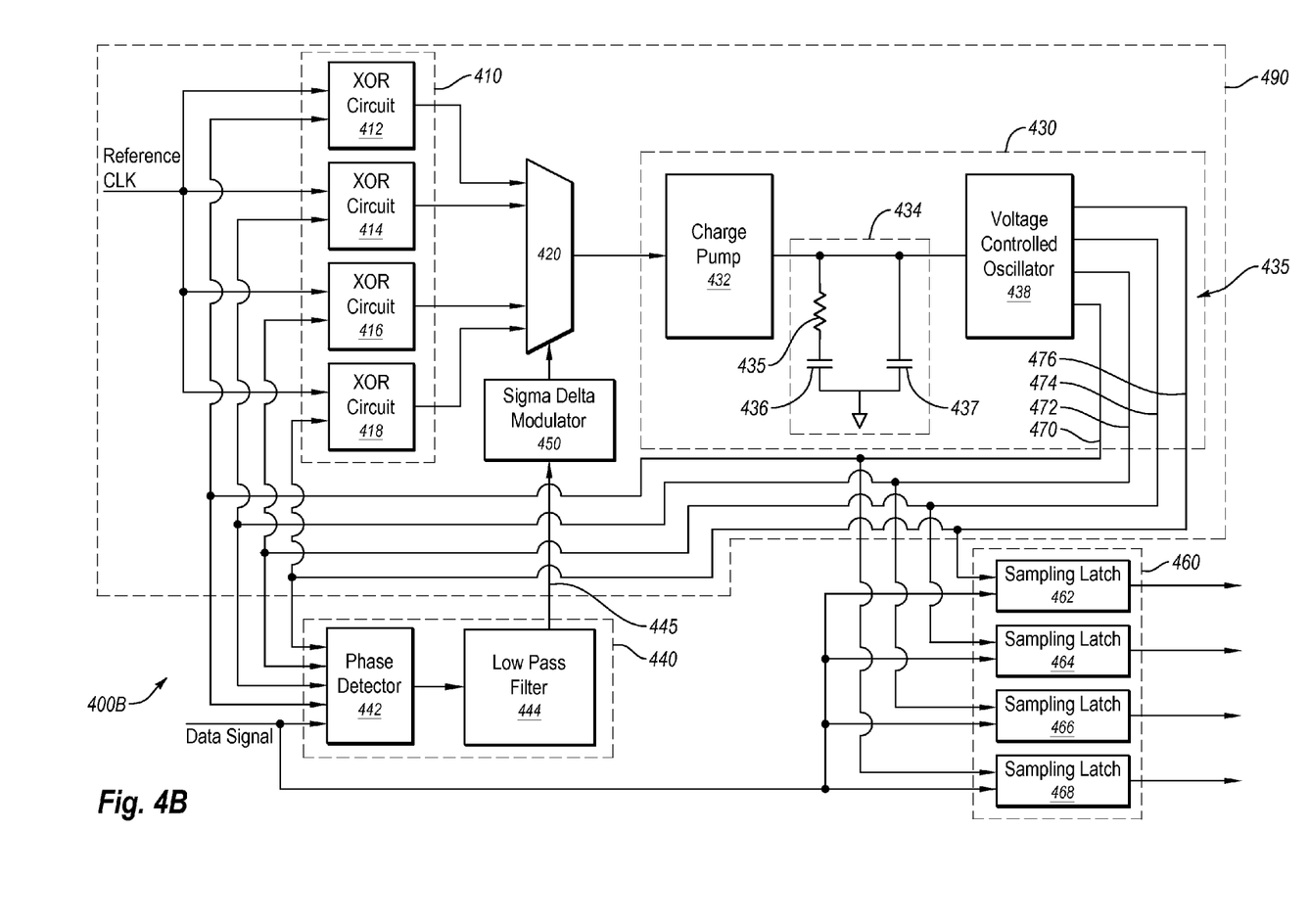
FIG. 4B is a block diagram of an embodiment of the clock and data recovery circuit of FIG. 4A.

FIG. 4B is a block diagram of an embodiment 400B of the circuit 400A of FIG. 4A (hereinafter "circuit 400B"), arranged in accordance with at least some embodiments described herein. In particular, FIG. 4B illustrates the circuit 400B configured to generate four clock signals. The circuit 400B may include four clock paths 470, 472, 474, 476, including one for each of the clock signals generated by the clock signal generator 430. The circuit 400B may further include four XOR circuits 412, 414, 416, 418 that collectively form the XOR circuits 410 of FIG. 4A. Each of the XOR circuits 412, 414, 416, 418 may be coupled to the reference clock and one of the clock paths 470, 472, 474, 476.

The circuit 400B may further include four sampling latches 462, 464, 466, 468 corresponding to the sampling latches 460 of FIG. 4A. Each of the sampling latches 462, 464, 466, 468 may be coupled to the data signal and one of the clock paths 470, 472, 474, 476. The circuit 400B further illustrates the loop filter 434 including a resistor 435 and two capacitors 436 and 437.

The circuit 400B may include additional components and circuitry other than that described herein.

Figure 5:
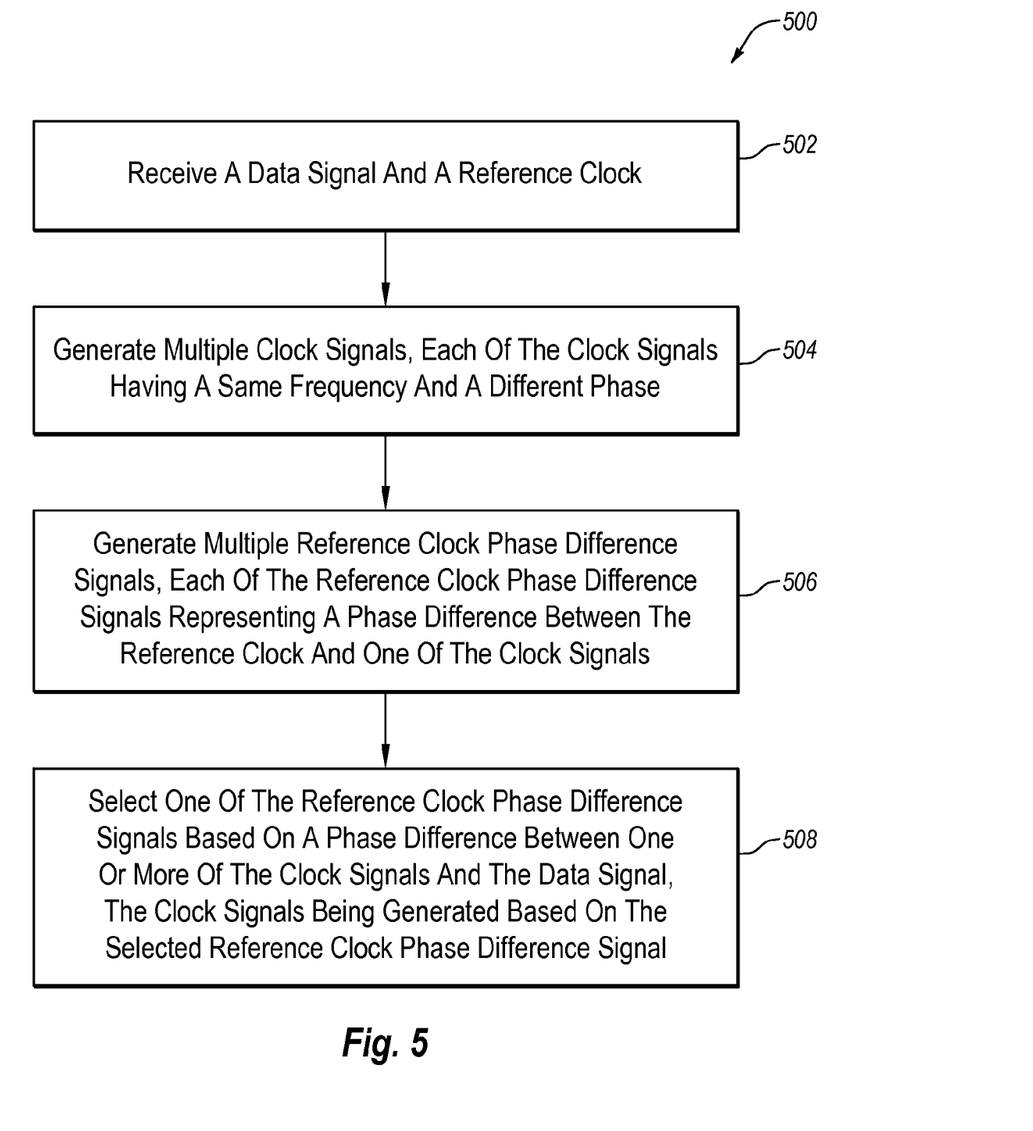
FIG. 5 is a flow chart of an example method of recovering data and a clock from a data signal.

FIG. 5 is a flow chart of an example method 500 of recovering data and a clock from a data signal, arranged in accordance with at least some embodiments described herein. The method 500 may be implemented, in some embodiments, by a clock and data recovery circuit, such as the clock and data recovery circuits 100, 300, 400A, 400B of FIGS. 1, 3, 4A, and 4B respectively. Although illustrated as discrete blocks, various blocks may be divided into additional blocks, combined into fewer blocks, or eliminated, depending on the desired implementation. The method 500 may begin at block 502, where a data signal and a reference clock may be received.

In block 504, multiple clock signals may be generated. Each of the clock signals may have a same frequency and a different phase. In some embodiments, the clock signals may be generated based on an average of two or more selected reference clock phase difference signals.

In block 506, multiple reference clock phase difference signals may be generated. Each of the reference clock phase difference signals may represent a phase difference between the reference clock and one of the clock signals. In some embodiments, each of the reference clock phase difference signals may be generated by performing an exclusive or operation on one of the clock signals and the reference clock.

In block 508, one of the reference clock phase difference signals may be selected based on a phase difference between one or more of the clock signals and the data signal. In these and other embodiments, the clock signals may be generated based on the selected reference clock phase difference signal.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 500 may further include generating a data phase difference signal based on a difference in phase between one or more of the clocks signals and the data signal. In these and other embodiments, one of the reference clock phase difference signals may be selected based on the data phase difference signal.

The method 500 may further include encoding the data phase difference signal. In these and other embodiments, one of the reference clock phase difference signals may be selected based on the encoded data phase difference signal. The method 500 may further include latching data from the data signal using the clock signals.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A circuit comprising:
    a phase difference selector configured to select one of a plurality of reference clock phase difference signals;
    a clock signal generator coupled to the phase difference selector, the clock signal generator configured to generate a plurality of clock signals based on the selected reference clock phase difference signal, each of the clock signals having a same frequency and a different phase;
    a reference clock phase detector coupled to the phase difference selector and the clock signal generator, the reference clock phase detector configured to generate the reference clock phase difference signals, each of the reference clock phase difference signals representing a phase difference between a reference clock and one of the clock signals; and
    a data signal phase detector coupled to the clock signal generator and the phase difference selector, the data signal phase detector configured to generate a data phase difference signal based on differences in phase between one or more of the clock signals and a data signal, the data phase difference signal being used by the phase difference selector to select one of the reference clock phase difference signals.

2. The circuit of claim 1, further comprising an encoder coupled between the data signal phase detector and the phase difference selector, the data phase difference signal being encoded by the encoder before being received by the phase difference selector.

3. The circuit of claim 2, wherein the encoder is a sigma delta modulator.

4. The circuit of claim 2, wherein a bandwidth of the clock signal generator is less than a bandwidth of the encoded data phase difference signal.

5. The circuit of claim 4, wherein the clock signal generator is further configured to average two or more of the selected reference clock phase difference signals and to generate the clock signals based on the average of the two or more of the selected reference clock phase difference signals.

6. The circuit of claim 5, wherein the clock signal generator comprises a charge pump and a loop filter configured to average the two or more of the selected reference clock phase difference signals.

7. The circuit of claim 1, further comprising a plurality of sampling latches, each of the sampling latches configured to receive the data signal and one or more of the sampling latches configured to latch data from the data signal using one of the clock signals.

8. The circuit of claim 1, wherein the reference clock phase detector comprises a plurality of exclusive or (XOR) circuits, each of the XOR circuits configured to generate one of the reference clock phase difference signals using the reference clock and one of the clock signals.

9. The circuit of claim 1, wherein the data signal phase detector comprises a phase detector and a low pass filter.

10. The circuit of claim 1, wherein the clock signal generator comprises a charge pump, a loop filter, and a voltage controlled oscillator.

11. The circuit of claim 1, wherein the data signal has a higher frequency than a frequency of the reference clock.

12. A circuit comprising:
    a clock signal generator configured to generate a plurality of clock signals having a same frequency and different phases;
    a digital data signal phase detector configured to detect a phase difference between one or more of the clock signals and a received data signal and to generate a digital data phase difference signal based on the detected phase difference;
    an encoder comprising a sigma delta modulator configured to encode the digital data phase difference signal to produce an encoded digital data phase difference signal that has a larger bandwidth than the digital data phase difference signal;
    a reference clock phase detector configured to detect a phase difference between each of the clock signals and a received reference clock, the reference clock phase detector further configured to generate a plurality of reference clock phase difference signals, each reference clock phase difference signal representing the phase difference between one of the clock signals and the reference clock; and
    a phase difference selector configured to select one of the reference clock phase difference signals based on the encoded digital data phase difference signal, the clock signal generator generating the clock signals based on the selected reference clock phase difference signal.

13. The circuit of claim 12, wherein a bandwidth of the clock signal generator is less than the bandwidth of the encoded digital data phase difference signal.

14. The circuit of claim 13, wherein the clock signal generator is further configured to average two or more of the selected reference clock phase difference signals and to generate the clock signals based on the average of the two or more of the selected reference clock phase difference signals.

15. A method of recovering a clock and data from a data signal, the method comprising:
- receiving a data signal and a reference clock;
- generating a plurality of clock signals, each of the clock signals having the same frequency and a different phase;
- generating a plurality of reference clock phase difference signals, each of the reference clock phase difference signals representing a phase difference between the reference clock and one of the clock signals; and
- selecting one of the reference clock phase difference signals based on a phase difference between one or more of the clock signals and the data signal, the clock signals being generated based on the selected reference clock phase difference signal.

16. The method of claim 15, further comprising generating a data phase difference signal based on a difference in phase between one or more of the clock signals and the data signal, wherein the selecting one of the reference clock phase difference signals is based on the data phase difference signal.

17. The method of claim 16, further comprising encoding the data phase difference signal, wherein the selecting one of the reference clock phase difference signals is based on the encoded data phase difference signal.

18. The method of claim 15, wherein the clock signals are generated based on an average of two or more of the selected reference clock phase difference signals.

19. The method of claim 15, wherein each of the reference clock phase difference signals is generated by performing an exclusive or operation on one of the clock signals and the reference clock.

20. The method of claim 15, further comprising latching data from the data signal using the clock signals.

* * * * *